Nov. 18, 1924.                                              1,516,159
               P. M. SOUTHWORTH ET AL
                    DISPLAY DEVICE
                  Filed July 21, 1924
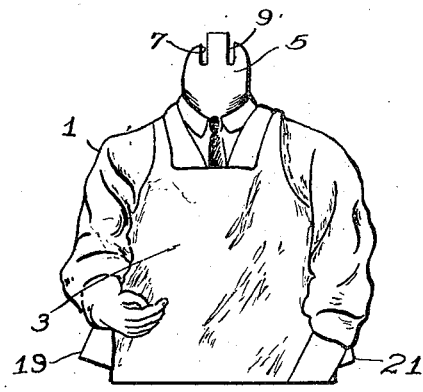
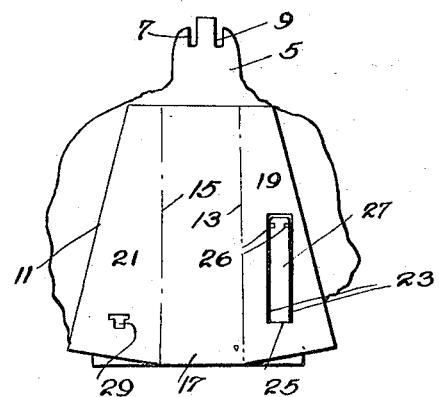
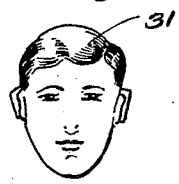
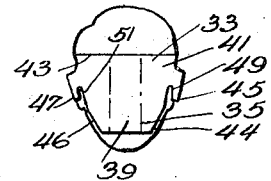
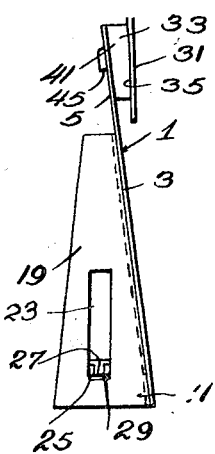
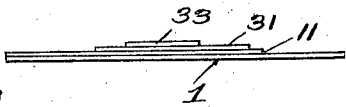
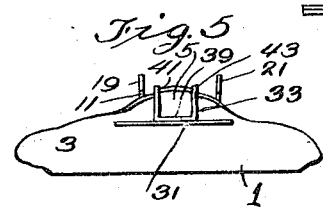
Inventors
Philip M. Southworth
and George Hornecker
By Delos G. Haynes
Attorney Patented Nov. 18, 1924.

1,516,159

UNITED STATES PATENT OFFICE.

PHILIP M. SOUTHWORTH, OF BROOKLYN, AND GEORGE HORNECKER, OF ELMHURST, NEW YORK, ASSIGNORS TO L. R. CONWELL, OF ELMHURST, NEW YORK.

DISPLAY DEVICE.

Application filed July 21, 1924. Serial No. 727,334.

*To all whom it may concern:*

Be it known that we, PHILIP M. SOUTH-WORTH and GEORGE HORNECKER, both citizens of the United States, and residents of the city of New York, borough of Brooklyn, county of Kings, and Elmhurst, Queens County, State of New York, respectively, have invented an Improvement in Display Devices, of which the following is a specification.

This invention relates to display devices and with regard to certain more specific features to a display of an actual photograph, or other likeness to a set of features, mounted in perspective relation to a support, said support forming the likeness of the body which might belong to said representation of a set of features.

Among the several objects of the invention may be noted the provision of a simple and inexpensive device for displaying the likeness to a set of features in perspective relationship to the general likeness of a body which might go with said features; the provision of means for interchanging said general body likeness among a plurality of feature likenesses; and means for making the body likeness a support to the feature likenesses. Other objects will be in part obvious and in part pointed out hereinafter.

The invention accordingly comprises the features of construction, combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a plan view of the supporting members laid flat;

Fig. 2 is a plan view of the supported members laid flat;

Fig. 3 is a side elevation of the assembled device;

Fig. 4 is a front elevation of Fig. 3;

Fig. 5 is a top plan view of the assembled device;

Figure 6 is a rear plan view of the supporting members laid flat;

Figure 7 is a rear plan view of the supported members laid flat; and

Figure 8 is an end view of the device folded for shipment.

Similar reference characters indicate corresponding parts throughout the several views of the drawings.

Referring now more particularly to Figs. 1, 2, 6 and 7 of the accompanying drawings there is illustrated at 1 a body display formed of a single sheet of suitable material such as patent coated manila. For a size such as 18½ x 44 inches, a thickness of 25 points is suitable. The lower portion 3 of this body display is formed in the likeness of a body, say for instance, one dressed as a storekeeper. In order to attain this likeness the piece is properly die-cut and lithographed or other like operations are performed upon it.

At the top of the piece 1 is integrally formed the irregularly shaped tongue 5 incised downwardly with the notches or slots 7 and 9.

To the rear of the body display 1 is formed the support 11 (Figs. 1, 3 and 6), said support comprising a quadrilateral sheet of the above named material scored vertically at 13 and 15 in order that a central area 17 be formed for gluing said support to the body display sheet, and in order that the wings 19 and 21 may be bent rearwardly, thereby bracing the display in a standing position. The lower edges of wings 19 and 21 are preferably not formed in the same normal plane as the lower edge of the display piece, when folded as in Fig. 1, but are so formed that when the wings are folded rearwardly, the display piece shall slope rearwardly (see Fig. 3).

The left-hand wing 19 is provided with a tongue shaped incision 23 and a cooperating score 25 for forming the tongue 27 adapted to slip into the T-shaped hole 29 cut in the right-hand wing 21. Before the wings are folded rearwardly the tongue 27 is bent into a plane normal to the wing 19 on the score 25, and upon placing the wings rearwardly, is slipped into the upper part of the hole 29 which has the same width on the upper cross of the T as the tongue. The tongue is then pressed downwardly so that the notches 26 therein cooperate with the parts adjacent the lower leg of the T. This completes the display support description.

In Figs. 2 and 7 is illustrated at 31 the photographic or other likeness to a set of features printed drawn or otherwise formed on any such material as a photographer, artist, or other artisan is likely to use. The likeness is outlined by cutting away all portions of the picture except the head proper.

To the rear of this likeness 31 is formed the hanger 33, comprising a sheet of the material the display 1 is composed of. This hanger is scored vertically at 35 and 37 in order that the central area 39 may be formed for gluing to the said photographic or other likeness. The scores 35 and 37 also permit the wings 41 and 43 to be bent rearwardly. The wings are provided on their outer converging edges 44 and 46 with integrally formed ears 45 and 47 adapted, by means of the ear-slots 49 and 51 formed parallel to and along the aforesaid converging edges, to cooperate with the slots 7 and 9 of the display support. The scores 35, 37 and the slots 7, 9 are the same distance apart laterally and thereby the two pairs of slots cooperate properly, as described. Each of the edges 44 and 46 converge to the longitudinal center line of the hanger when flat at an angle equal to the angular devotion of the lower edges of the wings 19 and 21 to the lower edge of the display piece; thereby causing the head display to be vertical when mounted on the sloping body display.

Assembly of the head-piece upon the body-display support is performed by bending the wings 41 and 43 rearwardly through 90 degrees from the flat position and causing the incisions or ear-slots 49 and 51 to slip into the incisions 7 and 9 of the support. The manner of setting up the support has been described.

The projection of the head piece ahead of the body piece or support and the overlapping of the lower chin-portion of the former over the upper neck-portion of the latter presents an illusion of perspective to an observer. This illusion is enhanced by the forward, downward slope of the body piece, which suggests rotundity.

A preferred form for shipping is shown in Fig. 8, wherein the support 11 is glued to the body-display and the wings of the support laid in the plane of the central glued portion 17, also the tongue 27. The hanger wings are in the plane of their central glued portion 39 and laid on the supporting structure. The picture of the head may or may not be glued to said central portion 39. These pictures may be made locally and fastened to a shipped device of the kind described, or may be shipped with the other portions of the device.

It can be seen that no extraneous supports are required for mounting this device and only a small amount of gluing is needed in its manufacture. The die-cutting and lithographing are comparatively simple processes in manufacturing this article.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. An advertising device comprising a body display and support therefor; a photographic or other likeness of a set of features; and means for removably mounting the likeness on the body display in non-parallel relation thereto in such a manner as to appear an integral part thereof.

2. An advertising device comprising a body display and support therefor; a photographic or other likeness of a set of features; and means for removably mounting the likeness on the body display in non-parallel relation thereto in such a manner as to appear in perspective thereto and an integral part thereof.

3. An advertising device comprising a one-piece body display and support therefor; a photographic or other actual likeness of a set of features of a person; and a hanger for applying the actual likeness to the body display in offset relation thereto and in such a manner as to appear an integral part thereof.

4. An advertising device comprising a one-piece body display and a winged support therefor, said body display having a configuration in the likeness of a person; means for locking said wings of the support in display position; a photographic or other actual likeness of a set of features of a person; and a hanger for applying the actual likeness to the body display in such a manner as to appear an intergal part thereof.

5. An advertising device comprising a one piece body display, said body display having a configuration in the likeness of a person; hinged wings glued thereto for bracing purposes; a photographic or other actual likeness of a set of features of a person; and a hanger for applying the actual likeness to the body display in such a manner as to appear an integral part thereof.

6. An advertising device comprising a one piece body display, said body display having a configuration in the likeness of a person; hinged, rearwardly extending wings glued thereto; means for holding said wings in bracing position; a photographic or other actual likeness of a set of features; a hanger glued to the rear of said likeness and means for removably fastening the hanger to the body display in such a manner as to make the aforesaid feature likeness an apparently integral part of the body.

7. An advertising device comprising a one piece body display; hinged, rearwardly extending wings glued thereto; means for holding said wings in bracing position; a photographic or other actual likeness of a set of features; a hanger glued to the rear of said likeness and means for removably fastening the hanger to the body display in such a manner as to make the aforesaid feature likeness an apparently integral part of the body and offset forwardly in non-parallel relation and in apparent perspective thereto.

8. An advertising device comprising a one-piece body display, slots vertically cut therein at the top; hinged rearwardly extending wings glued thereto, with means for locking them in rearward position and means for folding them outwardly against the one-piece body display; a photographic or other actual likeness of a set of features; a hinged hanger glued to the rear of said likeness; slots cut in the hinges of said hanger adapted to cooperate with the aforementioned slots in the body display to hang the hanger and appended likeness on said body display in such a manner as to make the aforesaid feature likeness an apparently integral part of the body but offset forwardly in apparent perspective thereto.

9. An advertising device comprising a one-piece slanting body display, slots vertically cut therein at the top; hinged rearwardly extending wings glued thereto, with means for locking them in rearward position and means for folding them outwardly against the one-piece body display; a photographic or other actual likeness of a set of features; a hinged hanger glued to the rear of said likeness; slots cut in the hinges of said hanger adapted to cooperate with the aforementioned slots in the body display to hang the hanger and appended likeness on said body display in a vertical manner forward and at the top of said body display.

10. An advertising device comprising a one-piece slanting body display, slots vertically cut therein at the top; hinged rearwardly extending wings glued thereto, with means for locking them in rearward position and means for folding them outwardly against the one-piece body display; a photographic or other actual likeness of a set of features; a hinged hanger glued to the rear of said likeness; slots cut in the hinges of said hanger adapted to cooperate with the aforementioned slots in the body display to hang the hanger and appended likeness on said body display in a vertical manner forward and at the top of said body display, the lower portion of the feature likeness overlapping in forward projection the upper portion of the body display.

In testimony whereof, we have signed our names to this specification this 15th day of July, 1924.

PHILIP M. SOUTHWORTH.
GEO. HORNECKER.